(12) United States Patent
Asakura (10) Patent No.: US 8,776,159 B2
(45) Date of Patent: Jul. 8, 2014

(54) CONTENT DISTRIBUTION SYSTEM, CONTENT DISTRIBUTION SERVER, CONTENT DISTRIBUTION METHOD, AND CONTENT DISTRIBUTION PROGRAM

(75) Inventor: Takayoshi Asakura, Tokyo (JP)

(73) Assignee: NEC Corporation, Tokyo (JP)

( * ) Notice: Subject to any disclaimer, the term of this patent is extended or adjusted under 35 U.S.C. 154(b) by 352 days.

(21) Appl. No.: 12/744,621

(22) PCT Filed: Nov. 27, 2008

(86) PCT No.: PCT/JP2008/071533
§ 371 (c)(1),
(2), (4) Date: May 25, 2010

(87) PCT Pub. No.: WO2009/069692
PCT Pub. Date: Jun. 4, 2009

(65) Prior Publication Data
US 2010/0263013 A1 Oct. 14, 2010

(30) Foreign Application Priority Data
Nov. 27, 2007 (JP) .................................. 2007-306120

(51) Int. Cl.
G06F 7/04 (2006.01)
H04N 21/239 (2011.01)
G06F 21/10 (2013.01)
H04N 21/435 (2011.01)
H04N 7/173 (2011.01)

(52) U.S. Cl.
CPC ............ *H04N 21/2396* (2013.01); *G06F 21/10* (2013.01); *H04N 21/435* (2013.01); *H04N 7/17318* (2013.01)
USPC ........................................... 725/116; 726/30

(58) Field of Classification Search
CPC ............ H04N 21/2396; H04N 21/435; H04N 7/17318; G06F 21/10
USPC ......................................................... 725/116
See application file for complete search history.

(56) References Cited

U.S. PATENT DOCUMENTS 7,010,685 B1 * 3/2006 Candelore ...................... 713/164
7,068,789 B2 * 6/2006 Huitema et al. .............. 380/277
(Continued)

FOREIGN PATENT DOCUMENTS

| JP | 2003-069957 | 3/2003 |
| JP | 2004-056542 | 2/2004 |

(Continued)

OTHER PUBLICATIONS

FN: "Follow me TV"—TV Programm im Heimnetwzwerk, Inside-Digital.de, Jul. 15, 2006, XP002666114, Retrieved from the Internet: URL:http://www.inside-digital.de/news/2855.html [retrieved on Dec. 20, 2011].

(Continued)

*Primary Examiner* — Nasser Goodarzi
*Assistant Examiner* — Michael B Pierorazio
(74) *Attorney, Agent, or Firm* — Young & Thompson (57) ABSTRACT

A content distribution system is provided, in which time-shift viewing among a plurality of devices can be realized. The system includes, a device group management unit which manages a group to which audio-visual devices capable of realizing time-shift viewing mutually belong; a viewing state management unit which acquires viewing information of a content by the audio-visual device, and a time shift control unit which transmits permission information for viewing the content in a time-shifted manner and the viewing information of the content acquired by the viewing state management unit, to the audio-visual device included in the group managed by the device group management unit, in response to a time shift request issued by the audio-visual device.

21 Claims, 9 Drawing Sheets

(56) References Cited

U.S. PATENT DOCUMENTS

| | | | |
|---|---|---|---|
| 7,614,069 B2* | 11/2009 | Stone | 725/89 |
| 7,650,624 B2* | 1/2010 | Barsoum et al. | 725/138 |
| 8,032,911 B2* | 10/2011 | Ohkita | 725/74 |
| 8,121,706 B2* | 2/2012 | Morikawa | 700/2 |
| 8,381,310 B2* | 2/2013 | Gangotri et al. | 726/30 |
| 2003/0056093 A1* | 3/2003 | Huitema et al. | 713/156 |
| 2004/0117856 A1* | 6/2004 | Barsoum et al. | 725/138 |
| 2005/0216942 A1* | 9/2005 | Barton | 725/97 |
| 2005/0283815 A1* | 12/2005 | Brooks et al. | 725/126 |
| 2005/0289632 A1* | 12/2005 | Brooks et al. | 725/126 |
| 2006/0010481 A1* | 1/2006 | Wall et al. | 725/151 |
| 2006/0212197 A1* | 9/2006 | Butler et al. | 701/36 |
| 2006/0225105 A1* | 10/2006 | Russ | 725/78 |
| 2007/0050822 A1* | 3/2007 | Stevens et al. | 725/74 |
| 2007/0067808 A1* | 3/2007 | DaCosta | 725/62 |
| 2007/0079341 A1* | 4/2007 | Russ et al. | 725/89 |
| 2007/0101185 A1* | 5/2007 | Ostrowka | 714/6 |
| 2007/0124775 A1* | 5/2007 | DaCosta | 725/62 |
| 2007/0130601 A1* | 6/2007 | Li et al. | 725/112 |
| 2007/0157281 A1* | 7/2007 | Ellis et al. | 725/134 |
| 2007/0186254 A1 | 8/2007 | Tsutsui et al. | |
| 2007/0282990 A1* | 12/2007 | Kumar et al. | 709/223 |
| 2008/0013919 A1* | 1/2008 | Boston et al. | 386/83 |
| 2008/0092168 A1* | 4/2008 | Logan et al. | 725/44 |
| 2008/0134245 A1* | 6/2008 | DaCosta | 725/44 |
| 2008/0134256 A1* | 6/2008 | DaCosta | 725/62 |
| 2008/0155615 A1* | 6/2008 | Craner et al. | 725/91 |
| 2008/0235733 A1* | 9/2008 | Heie et al. | 725/46 |
| 2008/0244658 A1* | 10/2008 | Chen | 725/50 |
| 2008/0263611 A1* | 10/2008 | Lecomte | 725/114 |
| 2009/0205010 A1* | 8/2009 | Rodriguez et al. | 725/151 |
| 2009/0313662 A1* | 12/2009 | Rodriguez et al. | 725/87 |
| 2010/0005483 A1* | 1/2010 | Rao | 725/25 |
| 2010/0071076 A1* | 3/2010 | Gangotri et al. | 726/32 |
| 2010/0125876 A1* | 5/2010 | Craner et al. | 725/61 |

FOREIGN PATENT DOCUMENTS

| | | |
|---|---|---|
| JP | 2004-088466 | 3/2004 |
| JP | 2004-343445 | 12/2004 |
| JP | 2004-363659 | 12/2004 |
| JP | 2007-208936 | 8/2007 |

OTHER PUBLICATIONS

Rousseau, F. et al.: "Omnisphere: a personal communication environment", System Sciences, 2003. Proceedings of the 36th Annual Hawaii International Conference on Jan. 6-9, 2003, Piscataway, NJ, USA, IEEE, Jan. 6, 2003, pp. 295-304, XP010626735, ISBN: 978-0-7695-1874-9.

Wauters, T. et al.: "Co-operative Proxy Caching Algorithms for Time-Shifted IPTV Services", Software Engineering and Advanced Applications, 2006. SEAA '06. 32nd Euromicro Conference on Software Engineering and Advanced Applications, IEEE, PI, Aug. 1, 2006, pp. 379-386, XP031016352, DOI: 10.1109/Euromicro.2006.29, ISN: 978-0-7695-2594-5.

DVB Organization: "MHP-HN030R1.ppt", DVB, Digital Video Broadcasting, C/O EBU 17A Ancienne Route—CH—1218 Grand Saconnex, Geneva, Switzerland, May 17, 2004, XP017829048.

Extended European Search Report issued by the European Patent Office on Jan. 5, 2012 in European Patent Application No. 08854172.7, 6 pages.

International Search Report, PCT/JP2008/071533, Mar. 3, 2009.

\* cited by examiner

CONTENT DISTRIBUTION SYSTEM, CONTENT DISTRIBUTION SERVER, CONTENT DISTRIBUTION METHOD, AND CONTENT DISTRIBUTION PROGRAM

TECHNICAL FIELD

The present invention relates to distribution of broadcast contents, multicast contents, and unicast contents, and in particular, to content distribution enabling time-shift viewing of those contents among a plurality of terminals.

BACKGROUND ART

Time-shift viewing means that when a viewer interrupts viewing of a broadcast content (typically, television broadcasting, streaming, and the like), a multicast content, or a unicast content, viewing is restarted using the same device or another device from the point where the viewing is interrupted. Time-shift viewing includes not only restart of the interrupted viewing but also particular replay such as pause or rewinding.

In viewing of these contents, as a viewer often has to interrupt viewing due to a private matter and move to another place, it is required that the viewer can restart viewing easily in such a case, and in particular, restart viewing using a different device for viewing.

Techniques for content distribution systems considering time shift are disclosed in Patent Documents 1 to 3, for example. Patent Document 1 discloses a content distribution system in which when a viewer interrupts viewing of a broadcast content by a first broadcast receiver, if a time-shift replay is instructed from a second broadcast receiver, it is possible to replay the broadcast content stored in the first broadcast receiver from the point where the viewing was interrupted.

Patent Document 2 discloses a content distribution system including a transmitter and a receiver connected over a network, in which when a viewer interrupts viewing by the receiver of a multicast content transmitted from the transmitter, the multicast content can be replayed from the point where the viewing was interrupted then the viewing is restarted.

Patent Document 3 discloses a content distribution system, in which by sharing replay positional information among a plurality of streams in a common content, an authorized log-in user can easily continue viewing of the content regardless of the receiving environment or receiving terminals.
Patent Document 1: Japanese Unexamined Patent Publication 2004-363659
Patent Document 2: Japanese Unexamined Patent Publication 2004-088466
Patent Document 3: Japanese Unexamined Patent Publication 2004-056542

DISCLOSURE OF THE INVENTION

Problems to be Solved by the Invention

As the content distribution systems of Patent Documents 1 and 2 assume only two receiver/players, at maximum, capable of realizing interruption, resumption, and particular replay of viewing of a broadcast content or multicast content, time-shift viewing can be performed only within the same device or between two specified devices. Further, as a content to be viewed, among the stored contents, cannot be identified without an instruction of moved viewing from a user to the audio-visual device, time-shift viewing may not be performed.

On the other hand, the content distribution system of Patent Document 3 shares replay positional information for each user so as to solve the problem involved in Patent Documents 1 and 2, and the system enables time-shift viewing by any receiver/player connected to the network. However, in order to identify a user, the user must log in so as to perform user authentication. As such, this system requires annoying operation such as password input, or requires particular hardware for user authentication.

Further, in the case of performing time-shift viewing using a plurality of devices over a network, there is a possibility that an unauthorized user who is different from the original user who interrupted viewing may illegally view the content using a receiver/player which is not related to the original user. If such a case is possible, it will be beyond the scope of private use defined in Article 30 of Copyright Law, and infringe transmission enabling right defined in Article 23, Section 1 of Copyright Law. Accordingly, it is necessary to prevent such unauthorized viewing.

An exemplary object of the present invention is to provide a content distribution system, a content distribution device, a content distribution method, and a content distribution program, which do not need user authentication, and enable time-shift viewing easily using a plurality of devices while preventing unauthorized viewing.

Means for Solving the Problems

In order to achieve the above object, a content distribution system according to an exemplary aspect of the invention is a content distribution system for distributing a content such that the content is able to be viewed in a time-shifted manner by an audio-visual device, including: a device group management unit which manages a group to which audio-visual devices belong, the audio-visual devices being capable of realizing time-shift viewing mutually; a viewing state management unit which acquires viewing information of the content by the audio-visual device; and a time shift control unit which transmits permission information for viewing the content in a time-shifted manner and the viewing information of the content acquired by the viewing state management unit, to the audio-visual device included in the group managed by the device group management unit, in response to a time shift request issued by the audio-visual device.

Although the present invention is constructed as a content distribution system in the above example, the present invention is not limited to this example. The present invention may be constructed as a content distribution method, a content distribution server, or a content distribution program.

A content distribution server according to another exemplary aspect of the invention is a content distribution server for distributing a content to audio-visual devices capable of realizing time-shift viewing mutually, including: a device group management unit which manages a group to which audio-visual devices belong, the audio-visual devices being capable of realizing time-shift viewing mutually; a viewing state management unit which acquires viewing information of the content by the audio-visual device; and a time shift control unit which transmits permission information for viewing the content in a time-shifted manner and the viewing information of the content acquired by the viewing state management unit, to the audio-visual device included in the group managed by the device group management unit, in response to a time shift request issued by the audio-visual device.

A content distribution method according to still another exemplary aspect of the invention is a content distribution method for distributing a content such that the content is able to be viewed in a time-shifted manner by an audio-visual device, the method including: managing a group to which audio-visual devices belong, the audio-visual devices being capable of realizing time-shift viewing mutually; acquiring viewing information of the content by the audio-visual device; and transmitting permission information for viewing the content in a time-shifted manner and the viewing information of the content acquired by the viewing state management unit, to the audio-visual device included in the group, in response to a time shift request issued by the audio-visual device.

A content distribution program according to still another exemplary aspect of the invention is a content distribution program for controlling distribution of a content such that the content is able to be viewed in a time-shifted manner by an audio-visual device, the program causes a computer to perform: a function of managing a group to which audio-visual devices belong, the audio-visual devices being capable of realizing time-shift viewing mutually; a function of acquiring viewing information of the content by the audio-visual device; and a function of transmitting permission information for viewing the content in a time-shifted manner and the viewing information of the content acquired by the viewing state management unit, to the audio-visual device included in the group, in response to a time shift request issued by the audio-visual device.

Effects of the Invention

As the present invention manages a group of audio-visual devices capable of realizing time-shift viewing mutually, only the audio-visual devices included in the same group are allowed for time-shift viewing of a content, whereby it is possible to eliminate viewing by an unauthorized audio-visual device other than those included in the same group. As unauthorized viewing can be eliminated by only instructing a time shift request, which is a routine work necessary for time-shift viewing, by an authorized user, it is not necessary for the authorized user to perform authentication procedure, so that procedural burden on the authorized user can be eliminated.

BEST MODES FOR CARRYING OUT THE INVENTION

Hereinafter, exemplary embodiments of the invention will be described in detail based on the drawings.

Figure 1:
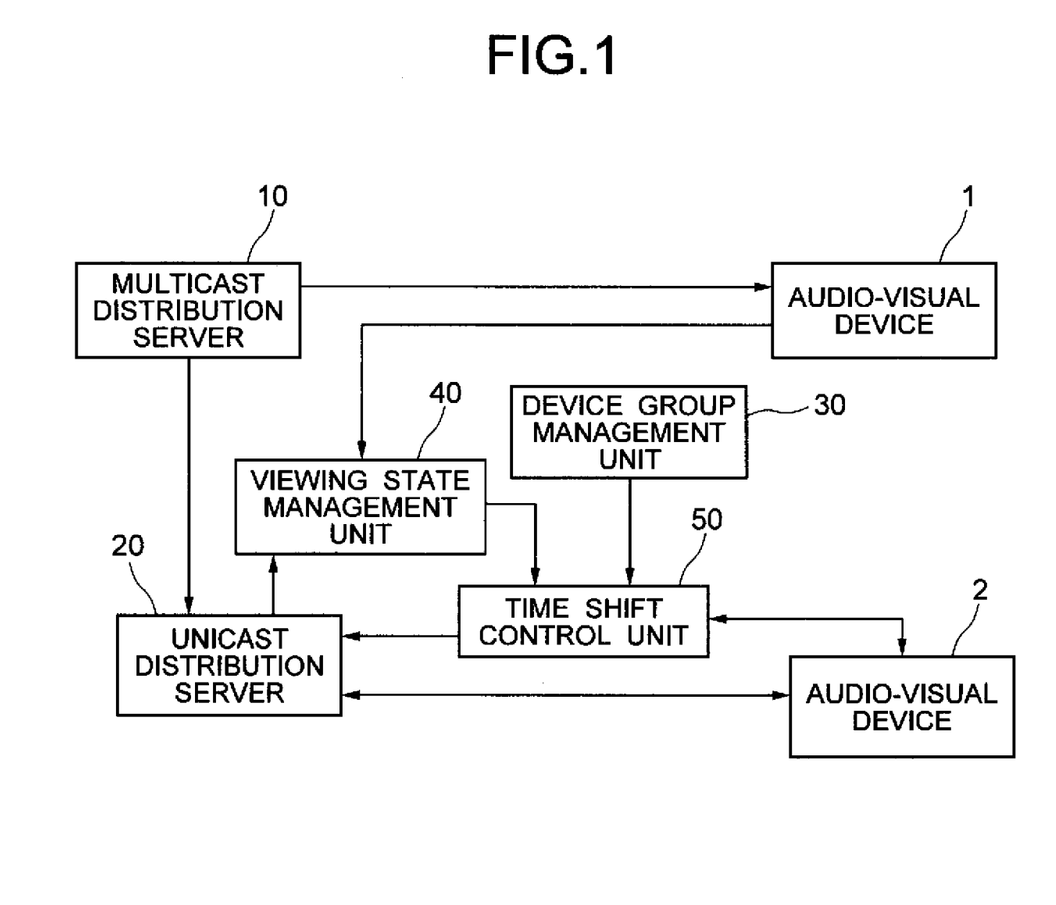
FIG. 1 is a block diagram showing the configuration of a content distribution system according to a first exemplary embodiment of the invention.

FIG. 1 is a block diagram showing the configuration of a content distribution system 1 according to a first exemplary embodiment of the invention.

As shown in FIG. 1, the content distribution system according to the first exemplary embodiment is a content distribution system for distributing a content such that the content is able to be viewed in a time-shifted manner by an audio-visual device. The system includes, as the basic configuration, a device group management unit 30 which manages a group to which audio-visual devices 1 and 2 belong, the audio-visual devices being capable of realizing time-shift viewing mutually, a viewing state management unit 40 which acquires viewing information of a content by the audio-visual devices 1 and 2, and a time shift control unit 50 which transmits, to the audio-visual devices 1 and 2 included in the group managed by the device group management unit 30, permission information for performing time-shift viewing of the content and viewing information of the content acquired by the viewing state management unit, in response to a time-shift requirement issued by the audio-visual devices 1 and 2.

Further, the example shown in FIG. 1 uses, as a distribution server for distributing the content, a multicast distribution server 10 which distributes the content in a multicast distribution manner, and a unicast distribution server 20 which distributes, in a unicast distribution manner, the content distributed by the multicast distribution server 10 to an audio-visual device.

The example shown in FIG. 1 describes two audio-visual devices 1 and 2. However, as an audio-visual device capable of mutually realizing time-shift viewing, it is acceptable that the device is a single audio-visual device solely capable of viewing a content before time shift and also capable of viewing the content after time shift. Alternatively, it is also acceptable that there are two audio-visual devices 1 for viewing a content before time shift and two audio-visual devices 2 for viewing the content after time shift, and that time-shift viewing can be performed among these audio-visual devices. In summary, the number of audio-visual devices is not limited to that shown in FIG. 1.

In the following description, the viewer 1 is assumed to be used for viewing a content before time shift, and the audio-visual device 2 is assumed to be used for viewing the content after time shift, that is, for viewing time-shifted content, in order to facilitate understanding.

In FIG. 1, the audio-visual device 1 receives and replays a content which is distributed in a multicast-distribution manner from the multicast distribution server 10 before time shift, and notifies the viewing state management unit 40 of a viewing state of the distributed content point by point or when the viewing ends. In this exemplary embodiment, a viewing state includes a content identifier for identifying a viewing content, a content replay position for specifying a viewing position of the content, a device identifier for identifying a device used for viewing the content, and date and time when the viewing ends.

The audio-visual device 2 issues a time shift request to the time shift control unit 50, and acquires information required for accessing the unicast distribution server 20 with which the time-shifted content can be viewed, that is, a URL for example. Upon acquiring the URL, the audio-visual device 2 accesses the unicast distribution server 20 indicated by the URL and requests for content distribution, and when the unicast distribution server 20 permits the access, the audio-visual device 2 receives and replays the content distributed from the unicast distribution server 20.

The multicast distribution server 10 distributes a broadcast content or a multicast content which has been set to be distributed. The multicast distribution server 10 may be a streaming server connected to the same network to which other elements shown in FIG. 1 are connected, or may be a transmitting place for television broadcasting not connected to the same network to which other elements shown in FIG. 1 are connected.

The unicast distribution server 20 receives a content distributed in a multicast distribution manner from the multicast distribution server 10 and stores it in a storage unit such as a hard disk. Also, the unicast distribution server 20 distributes, in a unicast distribution manner, a content which has been set to be distributed or a content stored in the storage unit, in response to a request from the audio-visual device 2. Further, the unicast distribution server 20 notifies the viewing state management unit 40 of a content distribution statue to the audio-visual device 2 point by point or when the viewing ends.

The device group management unit 30 manages a group to which the audio-visual devices 1 and 2, capable of realizing time shift mutually, belong. The group may include a single audio-visual device as described above, or two or more audio-visual devices. The content managed by the device group management unit 30 may be set by a user based on a service contract between the content distributor and the user.

The audio-visual devices 1 and 2 may be a desktop type personal computer (PC) that the user uses at home, a desktop type PC that the user uses in the office, and a laptop type PC or a mobile telephone that the user uses outdoor. These audio-visual devices can be registered in the same group in the device group management unit 30.

Figure 2:
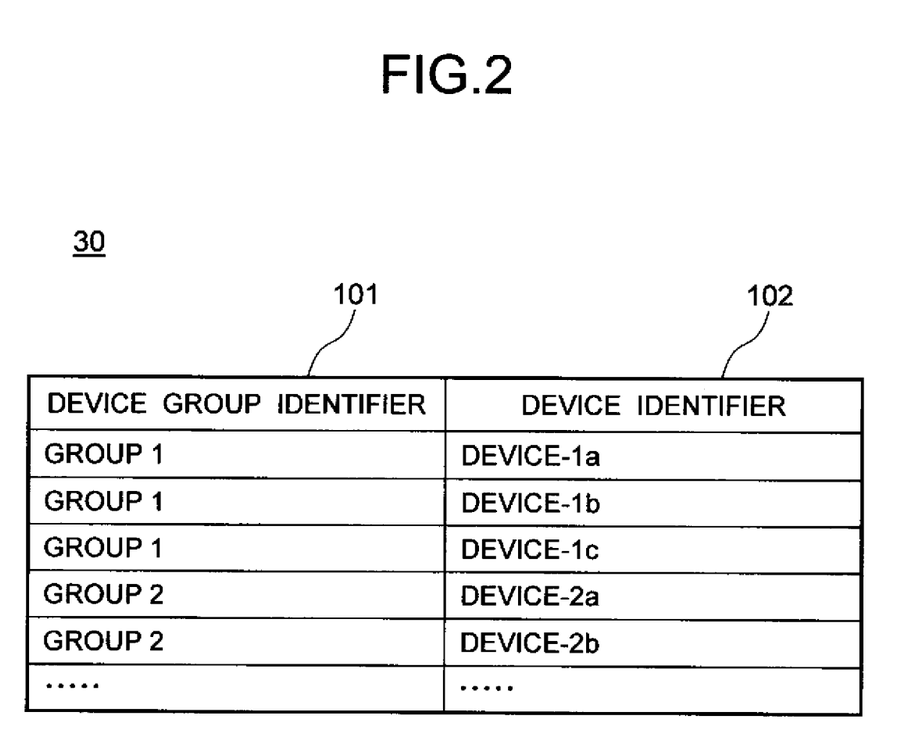
FIG. 2 is a conceptual diagram showing exemplary items of data held by the device group management unit disclosed in FIG. 1.

FIG. 2 is a schematic diagram showing exemplary items of data held by the device group management unit 30 disclosed in FIG. 1. The record data in the device group management unit 30 includes device identifiers 102 for uniquely identifying the audio-visual devices 1 and 2, and device group identifiers 101 for uniquely identifying the groups to which the audio-visual devices 1 and 2 belong.

The device identifier 102 is data for uniquely identifying each of the devices, such as an IP address, a machine name, an individual identification number, SIP, or URL. In the example of FIG. 2, Group 1 includes three audio-visual devices 1, to which the device identifiers 102 of Device-1a, Device-1b, and Device-1c are applied respectively, and Group 2 includes two audio-visual devices 2 to which the device identifiers 102 of Device-1 and Device-2 are applied respectively. It is noted that the number of audio-visual devices 1 and 2 belonging to each group is just an example, and is not limited to this number.

The viewing status management unit 40 stores a viewing state of a multicast distribution content received from the audio-visual device 1, and a viewing state of a unicast distribution content received from the unicast distribution server 20. In this example, a viewing state means information indicating to what point the content has been viewed in each audio-visual device.

Figure 3:
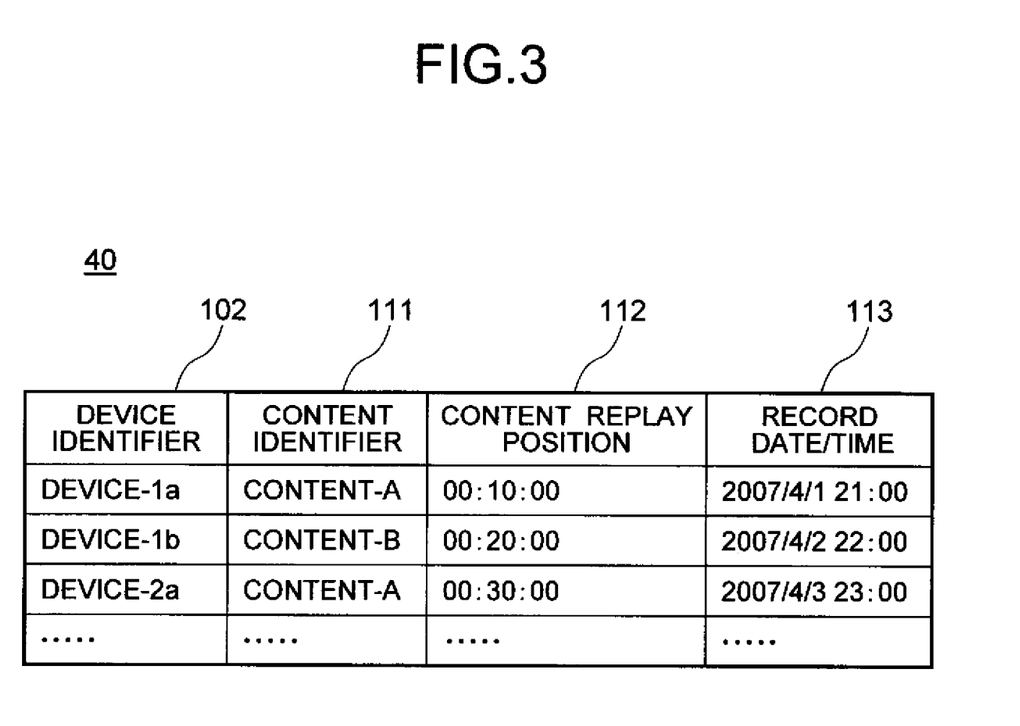
FIG. 3 is a conceptual diagram showing exemplary items of data held by the viewing state management unit disclosed in FIG. 1.

FIG. 3 is a schematic diagram showing exemplary items of data stored by the viewing state management unit 40 disclosed in FIG. 1. The viewing state management unit 40 manages the device identifiers 102 for uniquely identifying the audio-visual devices 1 and 2, the content identifiers 111 for uniquely identifying contents being viewed by the audio-visual devices 1 and 2, which are the acquired content viewing information, a content replay position 112 showing to which point the content has been viewed, and a record date and time 113 showing the date and time when the above information is recorded in the viewing state management unit, while classifying them in a table form as shown in FIG. 3.

In the example of FIG. 3, it is recognized that, based on the acquired content viewing information, the viewing state management unit 40 manages the content viewing information such that the audio-visual device 1 having the device identifier of Device-1a viewed a content having a content identifier of Content-A until 00:10:00, and the viewing record of the audio-visual device 1 is recorded at 21:00 of 2007 Apr. 1. Further, the viewing state management unit 40 also manages content information by storing a viewing state similarly for the audio-visual device 1 to which device identifier of Device-1b and Device-1 are applied (detailed description is omitted). Although the viewing state management unit 40 manages the information by only storing the latest record for viewing states of the respective audio-visual devices 1 and 2, it may manage the information by storing all past and present states notified by the audio-visual devices 1 and 2 and the unicast distribution server 20. Further, the viewing state management unit 40 may store viewing states of a plurality of contents for one audio-visual device 2.

The time shift control unit 50 transmits, in response to a time shift request issued by the authorized audio-visual device 2, permission information for time-shift viewing the content and viewing information of the content acquired by the viewing state management unit, to the audio-visual device 2 included in the group managed by the device group management unit 30. The time shift control unit 50 also transmits permission information for time-shift viewing the content and viewing information of the content acquired by the viewing state management unit 40, to the unicast distribution server 20 which distributes the content. When transmitting the information to the audio-visual device 2, the time shift control unit 50 transmits the information while adding information which is required by the audio-visual device 2 when it accesses the unicast distribution server 20, that is, URL for example.

Also, the time shift control unit 50 specifies a content which is the object of time shift viewing, and transmits viewing information of the content acquired by the viewing state management unit. The time shift control unit 50 may specify the content which is the object of time shift viewing based on the information managed by the device group management unit 30 and the viewing state management unit 40, and transmit viewing information of the content acquired by the viewing state management unit 40. Further, in addition to the permission for the time shift viewing of the content and the viewing information of the content acquired by the viewing state management unit 40, the time shift control unit 50 may additionally transmit a content list for specifying the content which is the object of the time-shift viewing.

More specifically, the time shift control unit 50 receives a time shift request from the audio-visual device 2, and sends back, to the authorized audio-visual device 2, access information to the unicast distribution server 20 required for time-shift viewing, that is, URL for example, according to the information of the device group management unit 30. If the audio-visual device for which the time shift control unit 50 received a time shift request is an unauthorized audio-visual device which does not correspond to the information of the device group management unit 30, the time shift control unit 50 rejects to send access information to the unicast distribution server 20. Further, if the time shift control unit 50 does not uniquely identifies the URL of the unicast distribution server to which the audio-visual device 2 connects, the time shift control unit 50 sends back viewer content candidates to the audio-visual device 2. When a viewing content selection notification is transmitted from the audio-visual device 2 in response to the viewing content candidates, the time shift control unit 50 sends back the URL of the unicast distribution server 20 to the audio-visual device 2.

Upon receiving a time shift request from the audio-visual device 2, the time shift control unit 50 specifies the device group identifier 101 to which the audio-visual device 2 issuing the time shift request belongs, from the record data in the device group management unit 30. For example, if the content of the device group management unit 30 is that shown in the example of FIG. 2, when an audio-visual device that the device identifier 102 thereof is Device-1a issues a time shift request, the time shift control unit 50 identifies that the device group identifier 101 to which the audio-visual device belongs is Group 1.

Next, the time shift control unit 50 acquires all device identifiers 102 belonging to the identified group, from the device group management unit 30. For example, when an audio-visual device having an identifier of Device-1a issues a time shift request, the time shift control unit 50 acquires all device identifiers Device-1a, Device-1b, and Device-1c that the device group identifier 101 thereof is in Group 1.

If the number of acquired device identifier 102 is one, the time shift control unit 50 acquires a content viewing state in the device identifier 102 from the viewing state management unit 40, generates an URL to the unicast distribution server 20, and sends it back to the audio-visual device 2. For example, when Device-1a is acquired as a device identifier, if the items in the viewing state management unit 40 is the same as those shown in the example of FIG. 3, information that Device-1a viewed Content-A at 21:00 of 2007 Apr. 1 up to 00-10-00 is acquired. As such, the time shift control unit 50 generates an URL as shown below.
http://Server/view.exe?device-id=Device-1a&content-id=Content-A&time=00:10:00

This URL means calling a program of view.exe present in a machine named Server, and in the device identifier 102=Device-1a, replaying a content identified by the content identifier 111=Content-A from a content replay position 112=00:10:00. It is noted that this URL is just an example.

When the audio-visual device 2 accesses this URL, it means that the audio-visual device 2 transmits respective pieces of information included in the URL to the unicast distribution server 20 at the same time that the audio-visual device 2 accesses the unicast distribution server 20. It is also acceptable to transmit this information to the audio-visual device 2 independent of the URL.

If the number of acquired device identifiers 102 is two or more, the time shift control unit 50 acquires viewing states of respective devices identified by the device identifiers 102 acquired from the viewing state management unit 40. For example, when Device-1a and Device-1b are acquired as device identifiers, the time shift control unit 50 acquires viewing states regarding the corresponding audio-visual devices 2, that is, a content identifier 111, a content replay position 112, and recording date and time 113, of each of the audio-visual devices 2. Then, the time shift control unit 50 transmits the acquired viewing state to the audio-visual device 2. The user looks the time-shift viewing contents on the screen, and selects a desired content to be viewed in a time-shifted manner.

When the time shift control unit 50 receives a viewing content selection notification which is information regarding the content selected by the user, the time shift control unit 50 generates a URL to the unicast distribution serve 20 which is the same as the case where the number of acquired device identifier 102 is one, and sends it back to the audio-visual device 2.

The unicast distribution server 20 determines whether or not time-shift viewing by the audio-visual device 2 receiving the permission information is possible, based on the information received from the time shift control unit 50.

Figure 4:
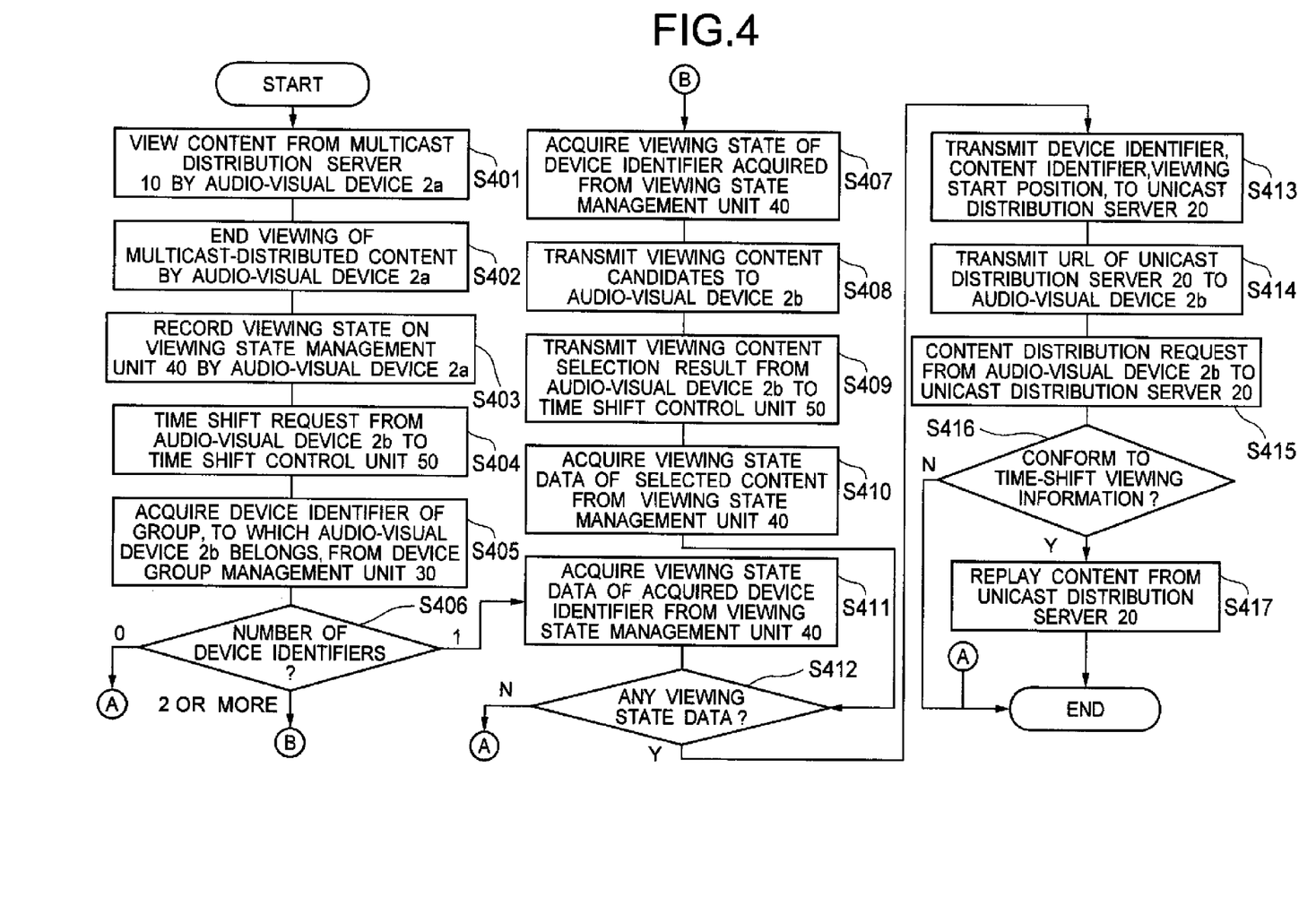
FIG. 4 is a flowchart showing the operation performed in the content distribution system disclosed in FIG. 1.

FIG. 4 is a flowchart showing the operation performed in the content distribution system 1 (mainly in the time shift control unit 50 and the unicast distribution server 20) disclosed in FIG. 1. In the flowchart of FIG. 4, it is assumed that the audio-visual device 1 is a device for viewing a content before time shift, and the audio-visual device 2 is a device for viewing the content after time shift. Further, it is also assumed that items stored in the device group management unit 30 and in the viewing state management unit 40 are those shown in the examples of FIGS. 2 and 3, respectively.

First, a content from the multicast distribution server 10 is received and viewed by the audio-visual device 1 (step S401). When viewing of the content by the audio-visual device 1 ends by an operation of the user (step S402), the audio-visual device 1 notifies the viewing state management unit 40 of the viewing state in the audio-visual device 1, and when the viewing state management unit 40 receives the viewing state, the viewing state management unit 40 stores the received viewing state (step S403).

It should be noted that the viewing state is assumed to include at least the content identifier 111 for identifying the viewing content, the content replay position 112 for identifying the viewing position of the content, the device identifier 102 for identifying the device in which the content was viewed, and recording date and time 113 indicating date and time when the viewing ended.

Then, in order to perform time-shift viewing, the audio-visual device 2 transmits a time shift request to the time shift control unit 50 in accordance with an instruction from the user (step S404). Upon receiving the time shift request, the time shift control unit 50 acquires all device identifiers 102 registered in the group to which the audio-visual device 2 issuing the time shift request belongs, from the device group management unit 30 (step S405).

Then, the time shift control unit 50 determines the number of the device identifiers 102 acquired at step S405 (S406), and if the number of the device identifiers 102 is zero (A at step S406), the time shift control unit 50 determines that the time shift request is from an audio-visual device not registered in the group, that is, from an unauthorized audio-visual device, and notifies the unauthorized audio-visual device of an unauthorized access, and ends the process.

If the number of acquired device identifiers 102 is two or more (B at step S406), the time shift control unit 50 acquires viewing states corresponding to the respective device identifiers 102 from the viewing state management unit 40 (step S407). The time shift control unit 50 transmits at least a list of the device identifiers 102 and the content identifiers 111 in the acquired viewing states, to the audio-visual device 2 as viewing content candidates (step S408).

If the time shift control unit 50 transmits the content identifier 111 to the audio-visual device 2 but the user has a trouble in identifying the content to be viewed in a time-shifted manner only with the content identifier 111, the time shift control unit 50 may acquire the title of the content, for example, from a metadata management server (not shown) and transmit it to the audio-visual device 2 together with the content identifier 111.

The authorized audio-visual device 2, which has received the viewing content candidates, presents the viewing content candidates to the user. The user selects a content to be viewed from the viewing content candidates presented on the screen, and inputs the selection information to the audio-visual device 2. When the user selects a content that the user wishes to view in a time-shifted manner from the presented contents, the audio-visual device 2 transmits the selection result to the time shift control unit 50 (step S409).

Upon receiving the selection result, the time shift control unit 50 acquires viewing state data (information about to what point the content was viewed) of the selected content (step S410), and the process moves to step S412. For example, in the selection result from the audio-visual device 2, if the device identifier 102 is Device-1a and the content identifier 111 is Content-A, the content replay position 112 is 00:10:00.

If the number of the device identifiers is one at step S406, this means that if there is only one audio-visual device enabling time-shift viewing mutually (in the example of FIG.

1, the case where the audio-visual device 1 and the audio-visual device 2 are identical), the time shift control unit 50 acquires viewing state data of the content in the device identifier 102 identifying the audio-visual device 2 which has issued the time shift request, from the viewing state management unit 40 (step S411), and the process is moved to step S412. For example, if the device identifier 102 is Device-1a, the content identifier 111 is Content-A and the content replay position 112 is 00:10:00.

Then, the time shift control unit 50 determines whether or not a content corresponding to the acquired viewing state data is present in the viewing state management unit 40 (step S412). If corresponding viewing state data is not present in the viewing state management unit 40, as there is no time-shift object content, the time shift control unit 50 ends the process (A at step S412). If the viewing state data is present, the time shift control unit 50 transmits, to the unicast distribution server 20, the device identifier 102, the content identifier 111, and the content replay position 112, which are acquired from the viewing state data as time-shift viewing information (step S413). Upon receiving the time-shift viewing information, the unicast distribution server 20 stores the received time-shift viewing information for a certain period of time.

The time shift control unit 50 further generates a URL to the unicast distribution server 20, and transmits it to the audio-visual device 2 (step S414). This URL includes information corresponding to the device identifier 102, the content identifier 111, and the content replay position 112, as described above. When transmitting the URL, it is desirable to use a secure communication method such as SSL such that the information included in the URL will not be intercepted by other devices. The audio-visual device 2 connects to the unicast distribution server 20 identified by the received URL to request content distribution (step S415).

Upon receiving the content distribution request, the unicast distribution server 20 refers to the device identifier 102, the content identifier 111, and the content replay position 112 included in the stored time-shift viewing information, and confirms that they conform to the device identifier 102, the content identifier 111, and the content replay position 112 included in the URL accessed by the audio-visual device 2 (step S416).

If the time-shift viewing information and the information described in the URL from the audio-visual device 2 conform to each other, the unicast distribution server 20 distributes the content to the audio-visual device 2, and the audio-visual device 2 receives the distributed content and replays the content to start time-shift viewing (step S417). If the time-shift viewing information and the information described in the distribution request from the audio-visual device 2 do not conform to each other at step S416, the unicast distribution server 20 determines the device as an unauthorized device, and rejects content distribution.

At the point where the content distribution by the audio-visual device 2 ends, time-shift viewing ends. However, it is possible to interrupt time-shift viewing before it ends and then continue viewing by means of time-shift viewing according to the method of the exemplary embodiment. In that case, the same audio-visual device 2 or another device registered in the device group management unit 30 as a device in the same group may be used.

In the exemplary embodiment, time-shift viewing can be performed between a plurality of audio-visual devices 1 and 2 which are managed as a group in the device group management unit 30, and also, it is possible to eliminate time-shift viewing by an unauthorized audio-visual device. In that case, as the time shift control unit 50 which receives a time shift request from the audio-visual device 2 transmits information regarding time-shift viewing not only to the audio-visual device 2 but also to the unicast distribution server 20 so as to check conformity with the viewing request from the audio-visual device 2, it is possible to eliminate unauthorized viewing request to the unicast distribution server 20.

With the exemplary embodiment, the following aspects can be performed. A user who interrupts viewing a broadcast content or a multicast content by a desktop PC at home can continue viewing of the content by a mobile telephone or a notebook PC when the user is out. Then, the user is also able to continue viewing in a time-shifted manner by a desktop PC in the office.

This operation is based on the premise that the "desktop PC at home", the "mobile telephone or notebook PC", and the "desktop PC at office" are registered as one group in the device group management unit 30. From devices belonging to that group, operation such as log-in is not required, so that time-shift viewing can be performed easily. However, it is impossible to perform time-shift viewing of the content in an unauthorized manner from a device not belonging to that group. Further, as only devices which are determined not to be used by people other than the user are registered in that group, time-shift viewing from these devices falls in the scope of private use, and does not infringe copyrights.

Figure 5:
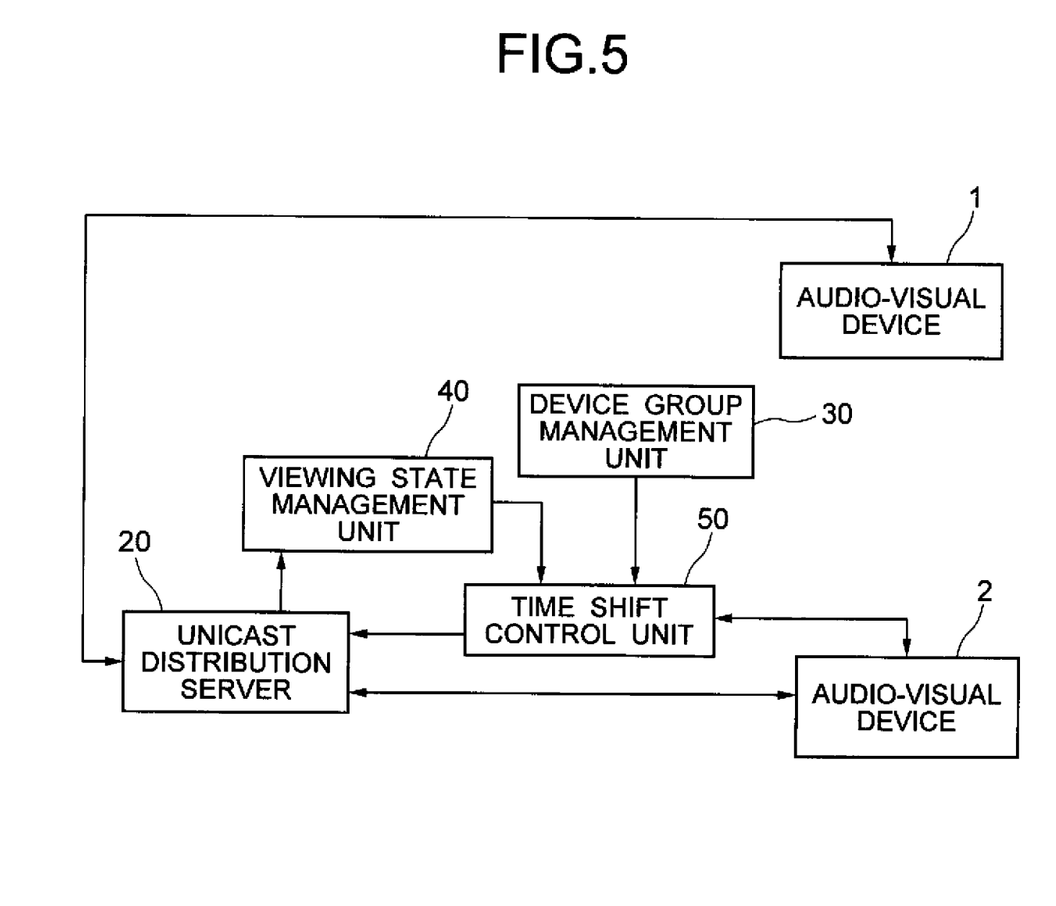
FIG. 5 is a block diagram showing the configuration of a content distribution system according to a second exemplary embodiment of the invention.

FIG. 5 is a block diagram showing the configuration of a content distribution system according to a second exemplary embodiment of the invention. As this content distribution system includes a number of the same elements as the content distribution system 1, the same elements are denoted by the same reference numerals, and only aspects different from those of the first exemplary embodiment are described and other aspects are omitted. In the content distribution system shown in FIG. 5, the multicast distribution server 10 is omitted, compared with the content distribution system 1 shown in FIG. 1. The audio-visual device 1 receives a content for viewing from the distribution server 20.

Figure 6:
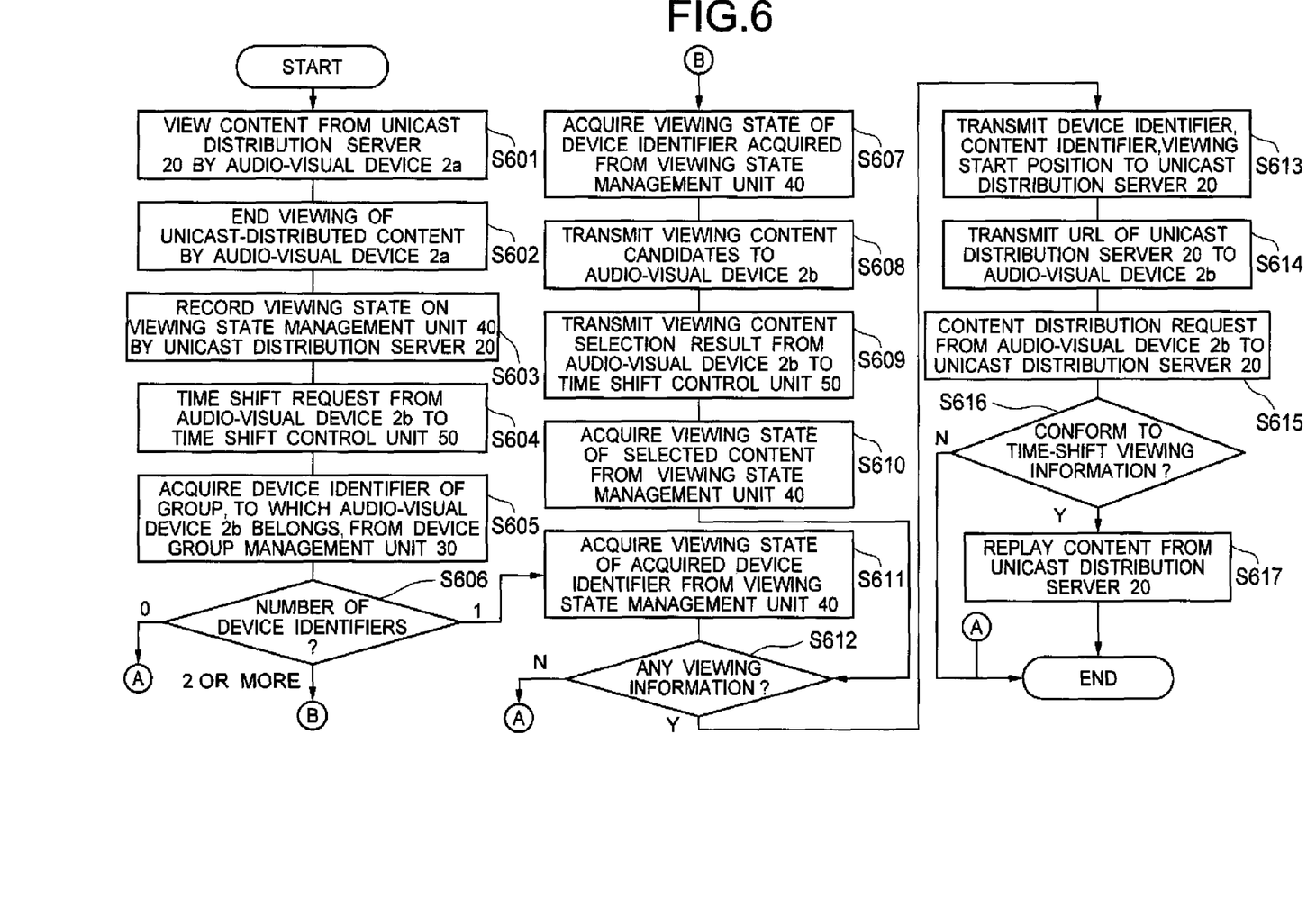
FIG. 6 is a flowchart showing the operation performed in the content distribution system disclosed in FIG. 5.

FIG. 6 is a flowchart showing operation performed in the content distribution system (mainly in the time shift control unit 50 and the unicast distribution server 20) disclosed in FIG. 5. First, a content from the unicast distribution server 20 is received for viewing by the audio-visual device 1 (step S601).

When content viewing by the audio-visual device 1 ends by an operation of the user (step S602), the unicast distribution server 20 notifies the viewing state management unit 40 of the viewing state in the audio-visual device 1, and the viewing state management unit 40 which received the viewing state stores the received viewing state (step S603). It is assumed that the viewing state includes at least the content identifier 111 identifying the viewing content, the content replay position 112 identifying the content viewing position, the device identifier 102 identifying the device with which the content was viewed, and the recording date and time 113 which is date and time when the viewing ended.

The viewing state management unit 40 shown in FIG. 5 acquires information of a content viewing state in the audio-visual device 1 before time shift from the unicast distribution server 20 rather than the audio-visual device 1, which is different from the first exemplary embodiment shown in FIG. 1.

As the processes after step S604 are the same as those shown in FIG. 4, the description thereof is omitted. It should be noted that the reference numerals of the respective steps are sequentially described such that 200 is added to the number of the respective steps of FIG. 4, that is, S404 is described as S604.

In the second exemplary embodiment of the invention, as the viewing state management unit 40 acquires a content viewing state by the audio-visual device 1 from the unicast distribution server 20, time-shift viewing of the content distributed from the unicast distribution server 20 can be performed by the same audio-visual device or between different audio-visual devices in the same manner as performing on the content distributed from the multicast distribution server in the first exemplary embodiment.

Figure 7:
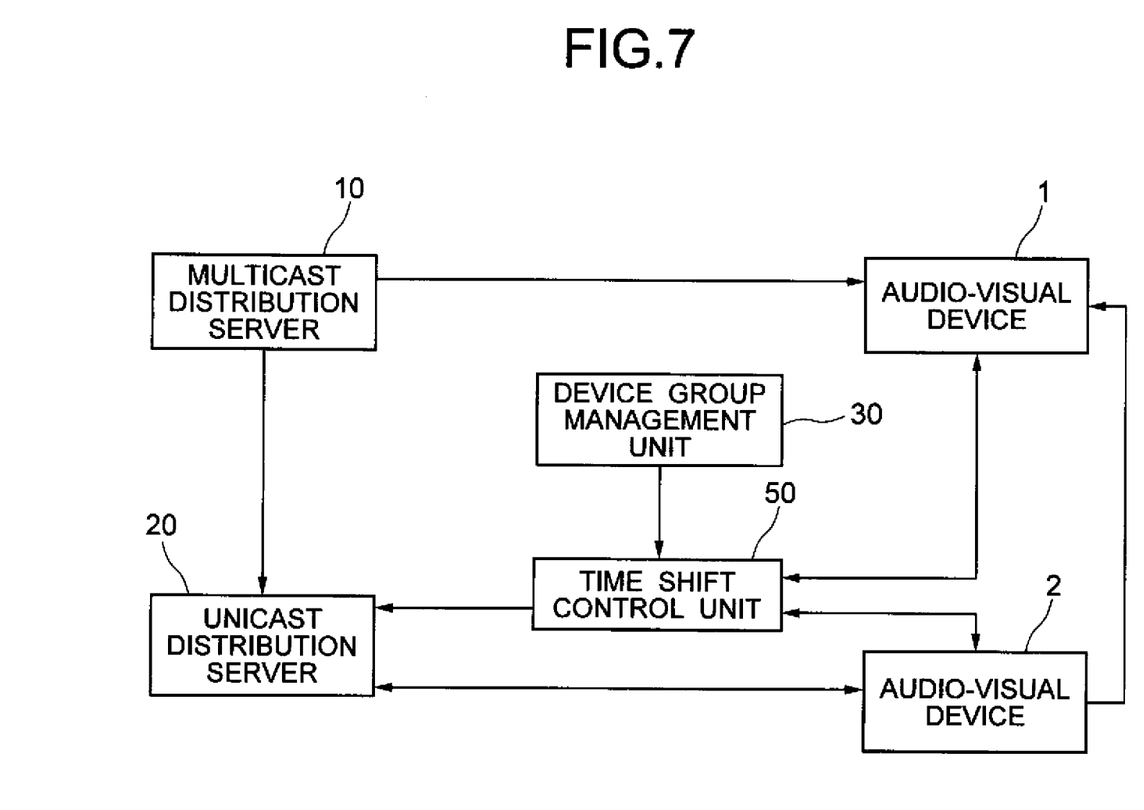
FIG. 7 is a block diagram showing the configuration of a content distribution system according to a third exemplary embodiment of the invention.

FIG. 7 is a block diagram showing the configuration of a content distribution system 301 according to a third exemplary embodiment of the invention. As the content distribution system shown in FIG. 7 includes a number of the same elements as those in the content distribution system shown in FIG. 1, the same elements are denoted by the same reference numerals, and only aspects different from those of the first exemplary embodiment are described and other aspects are omitted.

In the content distribution system shown in FIG. 7, the configuration of the viewing state management unit 40 is different from that in the content distribution system 1 shown in FIG. 1. Although the viewing state management unit 40 is provided independent of the audio-visual device 1 in FIG. 1, the viewing state management unit 40 acquires a content viewing state before time shift from the audio-visual device 1, and the information about the content viewing state before time shift is generated by the audio-visual device 1 through viewing of the content by the audio-visual device 1 itself.

As such, in the content distribution system shown in FIG. 7, the viewing state management unit 40 in FIG. 1 is substituted with the audio-visual device 1, so that the audio-visual device 1 functions as the viewing state management unit 40. The audio-visual device 1 is a personal computer or the like, and as it is possible to execute functions of the viewing state management unit 40 by this personal computer, the audio-visual device 1 can substitute the functions of the viewing state management unit 40.

As such, the viewer state management unit (audio-visual device 1) 40 in the content distribution system shown in FIG. 7 acquires information of a content viewing state in the audio-visual device 1 when the audio-visual device 1 used for viewing the content before time shift received a time shift request issued by the audio-visual device 2 capable of realizing time-shift viewing, and directly outputs this information to the time shift control unit 50.

Although the only functions which have to be at least held by the audio-visual devices 1 and 2 are described in the below description, there is no problem if each of the audio-visual devices have the both functions. The audio-visual device 1 receives a content which is distributed in a multicast distribution manner from the multicast distribution server 10 and replays the content.

When the audio-visual device 2 receives an instruction for performing time-shift viewing input by the user, the audio-visual device 2 outputs a time shift request to the audio-visual device 1 and to the time shift control unit 50, respectively.

The time shift request includes at least the content identifier 111, the content replay position 112, the device identifier 102 of an audio-visual device (=audio-visual device 2) issued a first time shift request, and the device identifier 102 of an audio-visual device (=audio-visual device 1) receiving the first time shift request.

The content identifier 111 is for identifying a content which is distributed from the multicast distribution server 10 and received by the audio-visual device 1, and the content replay position 112 is for indicating which part of the content was viewed by the audio-visual device 1. For example, when a first time shift request is issued by the audio-visual device 2 when the content Content-A is viewed up to 00:10:00 by the audio-visual device 1, a second time shift request includes data such as the content identifier 111=Content-A, the content replay position 112=00:10:00, the device identifier 102=audio-visual device 2, and the device identifier 102=audio-visual device 1.

When a time shift request is issued by the user, the audio-visual device 2 issues a time shift request to the audio-visual device 1. While the time shift request from the audio-visual device 2 to the audio-visual device 1 may be performed by typical IP communications, it may be performed by near field communications such as infrared communications (IrDA), Bluetooth, and wireless USB.

The audio-visual device 1 receiving the time shift request from the audio-visual device 2 functions as the viewing state management unit 40, and when the audio-visual device 1 for viewing the content before time shift receives the time shift request issued by the audio-visual device 2 capable of performing time-shift viewing, the viewing state management unit (audio-visual device 1) 40 acquires information about the content viewing state in the audio-visual device 1, and directly outputs it to the time shift control unit 50.

The audio-visual device 2, which issued the time shift request to the audio-visual device 1, finally acquires the URL of the unicast distribution server 20 from the time shift control unit 50, and requests the unicast distribution server 20 identified by the URL for content distribution, and receives the content distributed from the unicast distribution server 20 and replays it.

Upon receiving the time shift request from the audio-visual device 2, the time shift control unit 50 determines whether the audio-visual device is included in the group of the audio-visual device 1 and the audio-visual device 2, by referring to the information of the device group management unit 30. For example, in the example shown in FIG. 2, if the time shift request indicates Device-1a and Device-1b, the viewing state management unit (audio-visual device 1) 40 determines that it is in the same group.

If it is in the same group, the time shift control unit 50 refers to the information about content viewing state output by the viewing state management unit (audio-visual device 1) 40, generates a URL to the unicast distribution server from the content identifier and the content replay position included in the time shift request, and transmits the URL of the unicast distribution server 20 to the audio-visual device 2. A method of generating the URL is the same as that described in the first exemplary embodiment of the invention.

The constituent elements other than the audio-visual devices 1 and 2 and the time shift control unit 50 are similar to those of the first exemplary embodiment of the invention.

Figure 8:
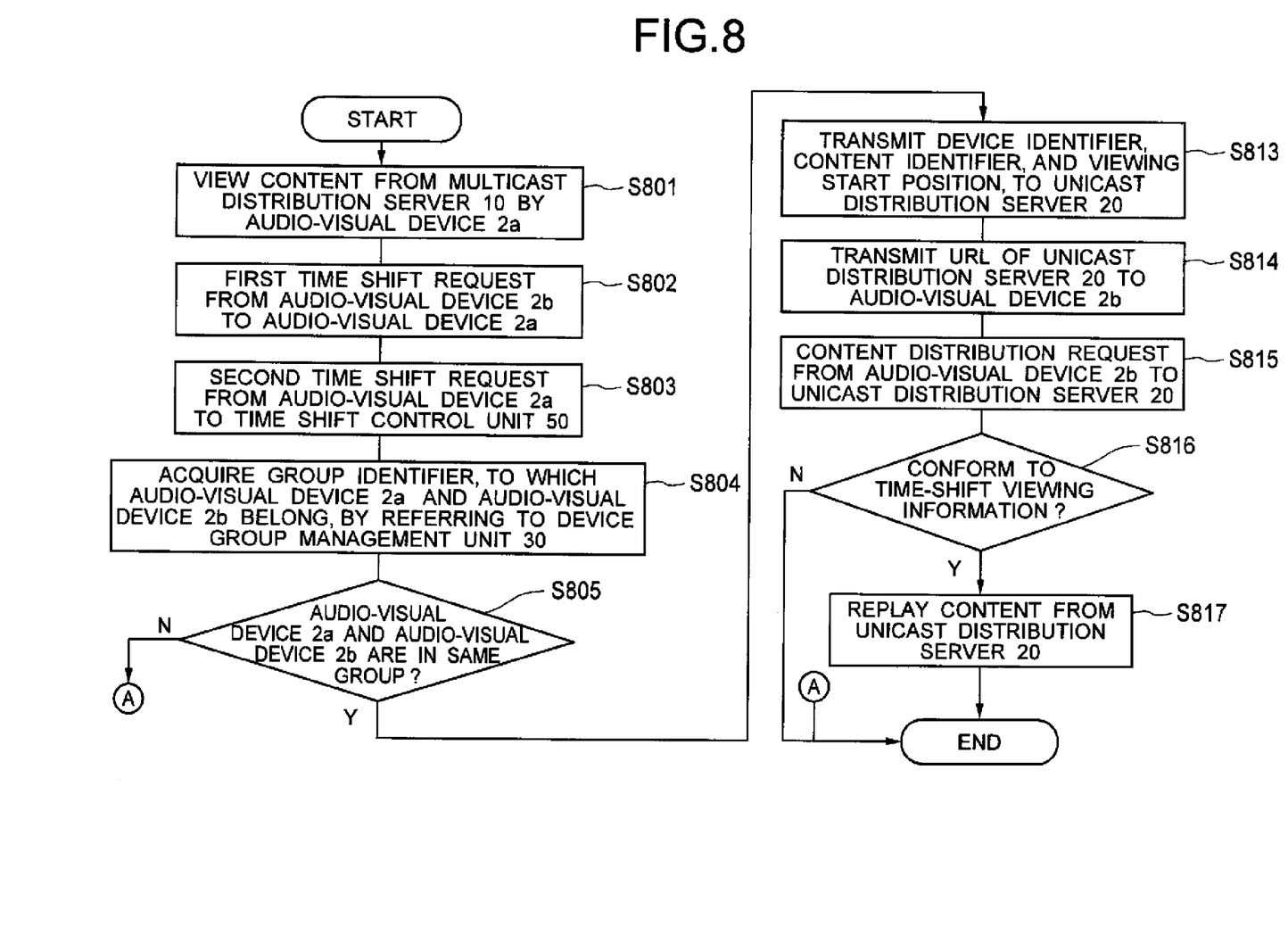
FIG. 8 is a flowchart showing the operation performed in the content distribution system disclosed in FIG. 7.

FIG. 8 is a flowchart showing operation performed in the content distribution system 301 (mainly in the audio-visual device 1, the time shift control unit 50, and the unicast distribution server 20) disclosed in FIG. 7. First, a content from the unicast distribution server 20 is received to be viewed by the audio-visual device 1 (step S801).

When a first time shift request is issued from the audio-visual device 2 to the audio-visual device 1 by the operation of the user (step S802), the audio-visual device 1 acquires the content identifier 111 of the content received from the multicast distribution server 10 and replayed, and the content replay position 112 of the content, and issues a second time shift request to the time shift control unit 50 (step S803).

Upon receiving the second time shift request, the time shift control unit 50 acquires a group identifier of the group, to which the audio-visual device 1 and the audio-visual device 2 described in the received time shift request belong, from the device group management unit 30 (step S804), and determines whether the both belong to the same group (S805). If they do not belong to the same group (A at step S805), the time shift control unit 50 ends the process by doing nothing.

If they belong to the same group, the time shift control unit 50 moves the process to step S813. As the processes after step S813 are the same as the processes after S413 in FIG. 4, their description is omitted. It is noted that the reference numerals of the respective steps are sequentially described such that 400 is added to the number of the respective steps of FIG. 4, that is, S413 is described as S813, and S414 is described as S814.

Alternative to direct transmission of the URL of the unicast distribution server 20 to the audio-visual device 2 which issued the time shift request to the audio-visual device 1, the time shift control unit 50 may transmit the URL via the audio-visual device 1 receiving the time shift request.

In the third exemplary embodiment of the invention, as the audio-visual device receiving a time shift request from the audio-visual device 2 functions as the viewer state management unit 40, time-shift viewing which is the same as that in the first and second exemplary embodiments can be realized. Further, it is also possible that the content viewed by the audio-visual device 1 can be viewed in a time-shifted manner by the audio-visual device 2 while continuing viewing of the content by the audio-visual device 1.

Figure 9:
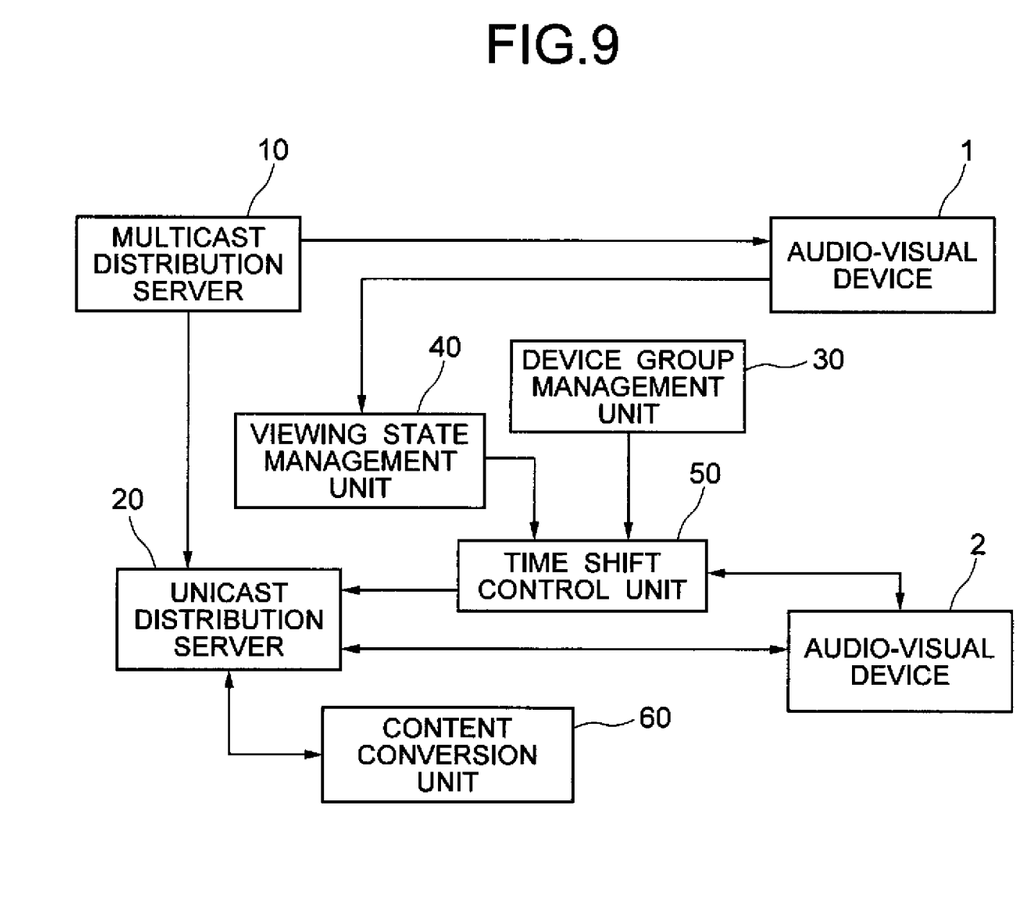
FIG. 9 is a block diagram showing the configuration of a content distribution system according to a fourth exemplary embodiment of the invention.

FIG. 9 is a block diagram showing the configuration of a content distribution system according to a fourth exemplary embodiment of the invention. As the content distribution system shown in FIG. 9 includes a number of elements which are common to those in the content distribution system shown in FIG. 1, the common elements are denoted by the same reference numerals, and only aspects different from the first exemplary embodiment are described, and description is omitted for other aspects.

In the content distribution system shown in FIG. 9, the unicast distribution server 20 includes a content conversion unit 60.

The content conversion unit 60 has a function of receiving a content from the unicast distribution server 20, converts the content and then transmits the content to the unicast distribution server 20. In this example, content conversion means conversion of a content into a format that the user can check the content in a shorter time, such as fast-forward, frame-by-frame replay, a specific scene replay, for example. A method for such content conversion is well known in Japan Unexamined Patent Publication No. 2004-069957, for example.

When distributing the content, the content distribution server 20 transmits the content to the content conversion unit 60, receives the converted content from the content conversion unit 60, and distributes it. The unicast distribution server 20 may allow all of the contents for distribution to be converted by the content conversion unit 60, or may transmit the content to the content conversion unit 60 to convert and transmit it only when receiving a request from the audio-visual device.

As the operation of the constituent elements and the processes other than those described above are similar to those in the first exemplary embodiment of the invention, the description thereof is omitted. Further, the content conversion unit 60 may be combined to the second or third exemplary embodiment of the invention.

In the fourth exemplary embodiment of the invention, as the content to be distributed by the unicast distribution server 20 is converted by the content conversion unit 60, the user can check the content in a short time. As such, even when the user temporarily interrupt viewing when live-viewing the content distributed from the multicast distribution server 10, and then starts time-shift viewing thereafter, it is possible to check the content transmitted during the time that the viewing is interrupted in a short time so as to return to live viewing from time-shift viewing (so-called follow-up replay).

In the above description, although the exemplary embodiments are constructed as content distribution systems, the present invention is not limited to them. The present invention may be constructed as a content distribution server. The content distribution server according to the exemplary embodiment may be constructed as a content distribution server for distributing a content to audio-visual devices capable of realizing time-shift viewing mutually as shown in FIGS. 1, 5, 7, and 9, including: a device group management unit 30 which manages a group to which audio-visual devices belong, the audio-visual devices being capable of realizing time-shift viewing mutually; a viewing state management unit 40 which acquires viewing information of the content by the audio-visual device; and a time shift control unit 50 which transmits permission information for viewing the content in a time-shifted manner and the viewing information of the content acquired by the viewing state management unit, to the audio-visual device included in the group managed by the device group management unit, in response to a time shift request issued by the audio-visual device.

Further, an exemplary embodiment of the invention may be constructed as a content distribution program which is to be read by a computer to perform the functions of the configurations shown in FIGS. 1, 5, 7, and 9 in accordance with the flows shown in FIGS. 4, 6, and 8.

While the present invention has been described with reference to the embodiments (and examples), the present invention is not limited to those embodiments (and examples). Various changes in form and details of the present invention which can be understood by those skilled in the art may be made within the scope of the present invention.

This application claims the benefit of propriety from Japanese patent application No. 2007-306120, filed on Nov. 27, 2007, the disclosure of which is incorporated herein in its entirety by reference.

INDUSTRIAL APPLICABILITY

The present invention is applicable to content distribution devices and content distribution systems for distributing contents using IP networks. Further, the present invention is also applicable to content distribution devices and content distribution systems for distributing contents not only using IP networks but also selectively using broadcast networks or mobile telephone networks.

REFERENCE NUMERALS 1,2 audio-visual device
10 multicast distribution server
20 unicast distribution server
30 device group management unit
40 viewing state management unit
50 time shift control unit
60 content conversion unit
102 device identifier

The invention claimed is:

1. A content distribution system for distributing a content such that the content is able to be viewed in a time-shifted manner by an audio-visual device, comprising:
a device group management unit which manages a group to which audio-visual devices belong, the audio-visual devices all being determined to be used only by a same user and being capable of realizing time-shift viewing mutually;
a viewing state management unit which acquires viewing information of the content by one of the audio-visual devices, the viewing information including a content identifier for uniquely identifying a viewing content and a content replay position that specifies a viewing position of the same user in the content; and
a time shift control unit which transmits permission information for viewing the content in a time-shifted manner and the viewing information of the content acquired by the viewing state management unit, to (i) a distribution server which distributes the content and (ii) another of the audio-visual devices included in the group managed by the device group management unit, in response to a time shift request issued by the another of the audio-visual devices without the same user having to perform an authentication procedure.

2. The content distribution system according to claim 1, wherein the distribution server determines whether or not time-shift viewing is able to be realized by an audio-visual device receiving the permission information, based on the information received from the time shift control unit.

3. The content distribution system according to claim 1, wherein the time shift control unit specifies a content which is an object of time-shift viewing, and transmits viewing information of the content acquired by the viewing state management unit.

4. The content distribution system according to claim 1, wherein the time shift control unit specifies a content which is an object of time-shift viewing based on information managed by the device group management unit and the viewing state management unit, and transmits viewing information of the content acquired by the viewing state management unit.

5. The content distribution system according to claim 1, wherein in addition to permission for time-shift viewing of the content and the viewing information of the content acquired by the viewing state management unit, the time shift control unit transmits a content list for specifying the content which is an object of the time-shift viewing.

6. The content distribution system according to claim 1, wherein
the distribution server includes a multicast distribution server which performs multicast distribution of a content, and a unicast distribution server which performs unicast distribution of a content, and
the unicast distribution server distributes, in a unicast distribution manner, a content distributed from the multicast distribution server to an audio-visual device which received the permission information.

7. The content distribution system according to claim 1, wherein the viewing state management unit acquires viewing information of the content from the audio-visual device viewing the content.

8. The content distribution system according to claim 1, wherein the viewing state management unit acquires viewing information of the content from one audio-visual device which received the time shift request from another audio-visual device.

9. The content distribution system according to claim 6, wherein the unicast distribution server includes a content conversion unit which applies, to the content to be distributed, a process of adjusting replay time in the audio-visual device.

10. A content distribution server for distributing a content to audio-visual devices capable of realizing time-shift viewing mutually, comprising:
a device group management unit which manages a group to which audio-visual devices belong, the audio-visual devices all being determined to be used only by a same user and being capable of realizing time-shift viewing mutually;
a viewing state management unit which acquires viewing information of the content by one of the audio-visual devices, the viewing information including a content identifier for uniquely identifying a viewing content and a content replay position that specifies a viewing position of the same user in the content; and
a time shift control unit which transmits permission information for viewing the content in a time-shifted manner and the viewing information of the content acquired by the viewing state management unit, to (i) a distribution server which distributes the content and (ii) another of the audio-visual devices included in the group managed by the device group management unit, in response to a time shift request issued by the another of the audio-visual devices without the same user having to perform an authentication procedure.

11. The content distribution server according to claim 10, wherein the distribution server determines whether or not time-shift viewing is able to be realized by an audio-visual device receiving the permission information, based on the information received from the time shift control unit.

12. A content distribution method for distributing a content such that the content is able to be viewed in a time-shifted manner by an audio-visual device, comprising:
managing a group to which audio-visual devices belong, the audio-visual devices all being determined to be used only by a same user and being capable of realizing time-shift viewing mutually;
acquiring viewing information of the content by one of the audio-visual devices, the viewing information including a content identifier for uniquely identifying a viewing content and a content replay position that specifies a viewing position of the same user in the content; and transmitting permission information for viewing the content in a time-shifted manner and the viewing information of the content acquired by a viewing state management unit, to (i) a distribution server which distributes the content and (ii) another of the audio-visual devices included in the group, in response to a time shift request issued by the another of the audio-visual devices without the same user having to perform an authentication procedure.

13. The content distribution method according to claim 12, wherein the distribution server determines whether or not time-shift viewing is able to be realized by an audio-visual device receiving the permission information, based on the information received from a time shift control unit.

14. The content distribution method according to claim 12, wherein a content which is an object of time-shift viewing is specified, and viewing information of the acquired content is transmitted.

15. The content distribution method according to claim 12, wherein in addition to permission for time-shift viewing of the content and the viewing information of the content acquired by the viewing state management unit, a content list for specifying the content which is an object of the time-shift viewing is also transmitted.

16. The content distribution method according to claim 12, wherein a content distributed in a multicast distribution manner is distributed in a unicast distribution manner to an audio-visual device which received the permission information.

17. The content distribution method according to claim 12, wherein viewing information of the content is acquired from the audio-visual device viewing the content.

18. The content distribution method according to claim 12, wherein viewing information of the content is acquired from one audio-visual device which received the time shift request from another audio-visual device.

19. A non-transitory computer readable recording medium storing a content distribution program for controlling distribution of a content such that the content is able to be viewed in a time-shifted manner by an audio-visual device, the program causing a computer to perform:

a function of managing a group to which audio-visual devices belong, the audio-visual devices all being determined to be used only by a same user and being capable of realizing time-shift viewing mutually;

a function of acquiring viewing information of the content by one of the audio-visual devices, the viewing information including a content identifier for uniquely identifying a viewing content and a content replay position that specifies a viewing position of the same user in the content; and a function of transmitting permission information for viewing the content in a time-shifted manner and the viewing information of the content acquired by a viewing state management unit, to (i) a distribution server which distributes the content and (ii) another of the audio-visual devices included in the group, in response to a time shift request issued by the another of the audio-visual devices without the same user having to perform an authentication procedure.

20. A content distribution system for distributing a content such that the content is able to be viewed in a time-shifted manner by an audio-visual device, comprising:

device group management means for managing a group to which audio-visual devices belong, the audio-visual devices all being determined to be used only by a same user and being capable of realizing time-shift viewing mutually;

viewing state management means for acquiring viewing information of the content by one of the audio-visual devices, the viewing information including a content identifier for uniquely identifying a viewing content and a content replay position that specifies a viewing position of the same user in the content; and time shift control means for transmitting permission information for viewing the content in a time-shifted manner and the viewing information of the content acquired by the viewing state management means, to (i) a distribution server which distributes the content and (ii) another of the audio-visual devices included in the group managed by the device group management means, in response to a time shift request issued by the another of the audio-visual devices without the same user having to perform an authentication procedure.

21. A content distribution server for distributing a content to audio-visual devices capable of realizing time-shift viewing mutually, comprising:

device group management means for managing a group to which audio-visual devices belong, the audio-visual devices all being used by a same user and being capable of realizing time-shift viewing mutually;

viewing state management means for acquiring viewing information of the content by one of the audio-visual devices, the viewing information including a content identifier for uniquely identifying a viewing content and a content replay position that specifies a viewing position of the same user in the content; and time shift control means for transmitting permission information for viewing the content in a time-shifted manner and the viewing information of the content acquired by the viewing state management means, to (i) a distribution server which distributes the content and (ii) another of the audio-visual devices included in the group managed by the device group management means, in response to a time shift request issued by the another of the audio-visual devices without the same user having to perform an authentication procedure.

* * * * *